(12) United States Patent
Cicero

(10) Patent No.: US 8,489,495 B2
(45) Date of Patent: Jul. 16, 2013

(54) SYSTEMS AND METHODS FOR IMPLEMENTING POST-MATCHING TRADING

(75) Inventor: Francesco Cicero, London (GB)

(73) Assignee: GFI Group, Inc., New York, NY (US)

( * ) Notice: Subject to any disclaimer, the term of this patent is extended or adjusted under 35 U.S.C. 154(b) by 0 days.

(21) Appl. No.: 13/311,311

(22) Filed: Dec. 5, 2011

(65) Prior Publication Data

US 2012/0143743 A1 Jun. 7, 2012

Related U.S. Application Data

(60) Provisional application No. 61/419,305, filed on Dec. 3, 2010.

(51) Int. Cl.
*G06Q 40/00* (2012.01)
(52) U.S. Cl.
USPC ............................................................ 705/37
(58) Field of Classification Search
USPC ........................................................ 705/37
See application file for complete search history.

(56) References Cited

U.S. PATENT DOCUMENTS

2004/0153403 A1* 8/2004 Sadre ............................... 705/39
2005/0192890 A1* 9/2005 Wallman ......................... 705/37

* cited by examiner

*Primary Examiner* — Lindsay M. Maguire

(57) ABSTRACT

Systems and methods for implementing post-matching trading are provided. A financial instrument transaction system may include a database configured to store financial instrument information for reference entities; a memory for storing execution instructions; and a processor. The processor may execute the instructions. The processor may initiate a trading session for a predetermined duration. Prior to and during the trading session, the processor may receive from a plurality of trader clients trading instructions associated with the reference entity. The instructions may include either a buy or sell position and a price. At the end of the trading session, the processor may determine, based on predefined criteria, whether the trading session qualifies for a post-matching session. If the trading session qualifies for a post-matching session, the processor may provide a graphical user interface to a selected group of traders for trading in the post-matching session.

7 Claims, 1 Drawing Sheet

| 120 | Credit | BSz | Bid | Offer | OSz | My BSz | My Bid | My Offer | My OSz |
|---|---|---|---|---|---|---|---|---|---|
| 0:57 | MDPAC 5y | 5 | 27 | 29 | 5 | 5 | 27 | 29 | 5 |
| 0:54 | UPC 5y (500) | 5 | 25 | 30 | 5 | 5 | 25 | 30 | 5 |

Live Prices — 100
102, 104, 106, 108, 110, 112, 114, 116, 118

| Live Prices | | | | | | | | |
|---|---|---|---|---|---|---|---|---|
| | Credit | BSz | Bid | Offer | OSz | My BSz | My Bid | My Offer | My OSz |
| 0:57 | MDPAC 5y | 5 | 27 | 29 | 5 | 5 | 27 | 29 | 5 |
| 0:54 | UPC 5y (500) | 5 | 25 | 30 | 5 | 5 | 25 | 30 | 5 |

SYSTEMS AND METHODS FOR IMPLEMENTING POST-MATCHING TRADING

CROSS-REFERENCED TO RELATED APPLICATIONS

This application is a non-provisional application of U.S. Provisional Patent Application Nos. 61/419,305, filed Dec. 3, 2010, entitled "SYSTEMS AND METHODS FOR IMPLEMENTING POST-MATCHING TRADING," which is hereby incorporated by reference herein in its entirety.

BACKGROUND OF THE INVENTION

This invention relates to trading systems and methods. Specifically, this invention relates to trading systems and methods for trading at, or close to, the mid-price. The mid-price of a security is on or about the average of current bid and current offer prices. The mid-price is typically quoted when it is necessary to provide a single number for a financial instrument price.

For the purposes of this disclosure, a matching session is a timed process whereby traders, or brokers on behalf of traders, can submit orders to buy or sell at an advertised price, or around a fixing price within a predefined price interval, in order to execute trades. The fixing price may be determined in a fixing session—i.e., a timed process whereby traders, or brokers on behalf of traders, submit bids and/or offers in a pool of liquidity not displayed to session participants, for the main purpose of determining a consensus-based price level that can be used for benchmarking and trading in the matching session. Such a fixing price may also be referred to herein, and treated as, a mid-price to the extent that either the fixing price and/or the mid-price may preferably offer a price for launching the matching session.

It would be desirable to allow trading during the matching phase at a price other than the mid-price.

It would be further desirable to implement a post-matching trading session for trading following the matching trading session.

SUMMARY

It is an object of the invention to implement a post-matching trading state for trading following the matching trading session. Apparatus and methods for a financial instrument transaction system are provided. The financial instrument transaction system may include a database configured to store financial instrument information for certain reference entities. The financial instrument transaction system may also include a memory configured to store execution instructions. The financial instrument transaction system may additionally include a processor coupled with the database and the memory. The processor may be configured to execute the instructions. The instructions may be configured to cause the processor to initiate a trading session for a predetermined duration. The instructions may also be configured to cause the processor, prior to and during the trading session, to receive from each of a plurality of trader clients trading instructions associated with a reference entity. The instructions may include either a buy or sell position and a price. The instructions may further be configured to, at the end of the trading session, causes the processor to determine, based on pre-defined criteria, whether the trading session qualifies for a post-matching session. Furthermore, the instructions may be configured to cause the processor to provide, if the trading session qualifies for a post-matching session, a graphical user interface to a selected group of traders for trading in the post-matching session. The instructions may also be configured to cause the processor to terminate the trading session if the trading session fails to qualify for the post-matching session.

BRIEF DESCRIPTION OF THE DRAWING

The objects and advantages of the invention will be apparent upon consideration of the following detailed description, taken in conjunction with the accompanying drawings, in which like reference characters refer to like parts throughout, and in which:

FIG. 1 shows a graphical user interface ("GUI") including an interactive dialogue box for use with systems and methods according to the invention.

DETAILED DESCRIPTION OF THE DISCLOSURE

Post matching trading according to the invention preferably includes three main components: the ability to enter, and preferably trade at, prices different from the mid-price, trading at a level that is determined by a matching algorithm which sets the trading price either at the mid-price or a price that is different from "trading in the mid-price," and the ability to generate a post-matching session.

Specifically, during matching, when traders enter orders at alternative price levels, the traders are permitted according to the invention to trade at different levels within a pre-defined spread from the mid-price. Depending on what prices the traders enter during the matching phase, the outstanding prices at the end of the matching phase and pending validation of the maximum bid/ask spread, systems and methods according to the invention may preferably post the qualifying prices and lock and engage the best bid and offer, in the post-matching phase.

Accordingly, this application addresses distinct aspects of conventional electronic trading systems. Particularly, this application addresses novel approaches to the action of determining the mid-price (either via a fixing phase or via an administratively-determined mid-price), and then the action of trading at the resulting mid-price. Typically, fixing and matching are two sequentially-organized phases. In addition, this application considers post-matching phase trading.

In one exemplary circumstance that shows how mid-price trading follows a fixing phase, if the fixing phase obtained a price of 55, the following scenarios may be included in mid-price trading:

Buyer @ 55, Seller @ 55=Trade @ 55

Buyer @ 56, Seller @ 55=Trade @ 55 (one may expect a trade @ 55.5, but trade execution may occur at the fixing price to both reward the most aggressive side and to emphasize the matching nature of the process where trading preferably occurs at or around the fixing level.)

Buyer @ 56, Seller @ 54.5=Trade @ 55 (an additional point of trading logic here is that by trading at the fixing price, it may serve to protect the traders' original prices in secrecy.)

Buyer @ 56, Seller @ 55.5=Trade at 55.5 (here trading occurs at the level that is closer to the fixing price between the two, again to reward the most aggressive trader and to preferably reinforce the matching character of the session).

The foregoing scenarios, as described above, occur during the matching phase of a trading session according to the invention.

In systems and methods according to the invention, an option to allow order entry at price levels which vary from the fixing price level by up to a predefined spread may be available for post-matching sessions. If there are unfilled bids and offers at alternate levels submitted during the matching session, then a post-matching session may be initiated, subject to the maximum bid-offer spread set for the session.

The post matching session may preferably allow order entry and trade execution via a pricesheet which lists the unfilled bids and orders and/or join-the-action ("JTA") popups.

JTA is a system which, seeks to enhance liquidity of an upcoming trading session as follows. JTA is like Credit-Match™, an electronic trading application manufactured by GFI Group of New York, N.Y., or any similar traditional trading system to the extent that quotes are visible to the market. Three main points that distinguish JTA are:

1) The JTA process includes a minimum duration and a maximum duration. Being timed also implies that an individual may manually launch a JTA session.

2) JTA may utilize a "popup"—i.e., an interactive dialogue box sent to selected traders to indicate that a JTA session is in progress—in order to dynamically engage clients, without requiring the clients to commit desktop real estate at all times.

3) JTA trader entitlements may preferably be independent from regular trader entitlements. For example, a trader can have a screen in CreditMatch where he can advertise prices that traders cannot execute electronically and that become fully interactive only within the boundaries of the JTA session. Or, alternatively, the trader can have a fully interactive screen for all users with a special JTA access that is available only for selected clients.

A post-matching session according to the invention may include an order clearing phase, during which the counterparties with the best bid and best offer may have priority for trade execution. The post matching session may follow modified JTA rules. However, unlike JTA, traders do not require special permission to participate in the post-matching session.

Such a post-matching session, according to the invention, can be accessed either via a typical matching graphical user interface ("GUI") or via a more specialized JTA GUI. Thus, JTA, according to the invention, is a way for a trader to get involved following the end of a matching session and to publish prices entered during matching that would otherwise be held for no further use.

Functional Details: Post-Matching Setup Fields Matching Price Entry

A setting according to the invention may be implemented which determines whether alternate price entry and post-matching sessions are enabled for the matching/fixing group of participants (hereinafter, "the group"). The matching price entry flag may be enabled for fixing+matching or matching-only sessions. If such a setting is flagged, then price entry different from the mid-price during matching is permitted.

In certain embodiments of the invention, the mid-price used during the matching phase can be either static and/or dynamic. In such embodiments where the mid-price is dynamic, the mid-price can change at predetermined intervals—e.g., resetting every 30 seconds in five-minute matching phase—or change substantially continuously. When the mid-price is dynamic, the mid-price may change, at least in part, in response to trading activity.

In some embodiments of the invention, the mid-price may be reset by a trade executed at an alternate level. The traded level becomes the new mid-price and the spread may be applied to it.

Post-Matching Session Options

If the Matching Price Entry is enabled for the matching group, the following additional options may be available for the session:

Best Price Only

This setting can determine whether the post matching session is restricted to the counterparties with the best unfilled bid and best unfilled offer, preferably regardless of the market depth—i.e., volume—associated with the best unfilled bid and best unfilled offer. Order entry from other traders is typically restricted during the clearing phase—i.e., the resolution state of the post-matching session. At the end of the clearing phase of the post-matching session, if neither side has been traded, both orders can be held and the post-matching session ends.

Allow Pull Out

This setting determines whether the trader is permitted to set his submissions to be excluded from the post-matching phase. If this setting is enabled, the "post unfilled for matching" setting determines whether unfilled matching submissions are included or excluded from the post-matching phase.

Post Unfilled for Post-Matching

A post unfilled setting can be created according to the invention. This setting determines whether a user's unfilled matching request is posted into the market during the post-matching phase. This setting preferably requires maximum spread conditions to be met—i.e., the user's unfilled matching request is within the predetermined spread—and "Allow Pull Out" is enabled for the session. The default setting of this is that matching requests can be posted by default if certain predetermined conditions are met.

For traders, this setting can preferably only be available for the following roles: Trader, Fixer—i.e., a trader that contributes prices to form the fixed price—and Joiner—i.e., a trader permissioned to join an ongoing, post-matching, trade state. This setting can be available for all brokers. If "Allow Pull Out" is disabled for the session, the post unfilled for matching setting can be ignored and all unfilled submissions can be posted during the post-matching phase, if conditions are met. The post unfilled for post-matching setting may only be applicable to matching sessions that have "Matching Price Entry" enabled.

Post-Matching Clearing Timer

A timeout setting may be added to the CreditMatch™ Matching/Fixing setup dialog, which determines the order clearing duration of the post-matching phase.

Once the post-matching clearing timer expires, if at least one live-trader-created-bid and one live-trader-created-offer exists on the interest, the session may continue as an extended phase (no-timeout) until the interest becomes unquoted. (For the purposes of this application, quoted means at least one bid and offer exists that are firm and posted. "Subject to", "no-post", and "held" orders preferably do not qualify for "quoted interest" status. The Post-Matching Clearing Timer may only be editable if "Matching Price Entry" is enabled for the group.

Post-Matching Spread

The post-matching spread setting may determine the following:

1. The maximum spread permitted between the mid price and the user entered bid or offer during the matching phase for each interest in the group.

2. The maximum spread permitted between the best unfilled bid and best unfilled offer that triggers a post-matching session for each interest in the group.

The magnitude of the post-matching Bid/Offer spread may be applied in Basis Points ("bps") or percent, or any other suitable metric, depending on how the interest is quoted. The Post-Matching Spread field may be disabled if the "Matching Price Entry" setting is unchecked.

Functional Details: Matching Workflow

Workflow During the Matching Phase

If matching price entry according to the invention is enabled for the session, then the matching session participants may have the ability to submit alternate price levels from the fixing level during the matching phase. This feature may be supported for matching sessions initiated after fixing sessions or matching only sessions.

In certain embodiments of the invention, users may have the ability, during the matching phase, to enter an alternate bid or offer from the fixing level. As noted above, the fixing level was calculated based on spread submissions during the fixing phase or fixing levels specified by a broker. Entering an alternate price level is optional, and users may participate in the matching session at the default fixing level.

If a user specifies an alternate price level, the submission may not be considered active/tradable until the user also specifies a size. Preferably only, but not exclusively, single-sided submissions are permitted, regardless of whether an alternate price level is specified—e.g., if a user enters a bid, and then enters an offer, the bid may be canceled and replaced by the offer. Alternate price levels may be worse than, equal to, or better than the default fixing level. The Post-Matching Spread defined for the interest in the setup dialog may determine the amount the bid or offer can deviate from the default fixing level. The price tick defined for the interest can determine the increments permitted for the alternate price levels.

Example

Post-Matching Spread=2

Default fixing level=100

Price tick=0.5

Bids and Offers permitted=98, 98.5, 99, 99.5, 100, 100.5, 101, 101.5, 102

Alternate Price Entry Validations

Orders that violate price validations can be rejected and an error message displayed at the top of the matching window. The price tick of the interest defined in the buffer may typically be enforced.

Example

Settings

Price tick=0.5

Post matching spread=1

Fixing level=100

Permitted bids or offers=99, 99.5, 100, 100.5, 101

Orders

In one exemplary scenario, a user may submit a buy request for 5 million (hereinafter "MM") at the fixing level, i.e., 100. The user may then update the price of the buy request to 98. In such a scenario, an update is rejected because the buy request is more than the pre-determined spread away from the fixing price and an error is generated.

At this point the original buy request at the fixing level may remain in the system. The user can then update the price of the buy request by reducing it to 99.75. The update may be rejected and an error may be generated. Following the rejection, the original buy request at the fixing level may remain in the system.

Aspects Relating to User Interface

General Requirements

The matching panel can preferably be modified to allow entry of an alternate price level, either on the bid side or the offer side. If alternate price submission is permitted for the matching session, the trade status field can display the price of the trade: <Bought/Sold><Size>@<Price>. An order ranking timestamp can be retained if either the price or size is modified as long as the user does not cancel and resubmit, or switch sides. Single-sided order submissions are preferred, but, in certain embodiments, two-sided submissions may also be permitted.

Bid/Offer columns in the matching popup can be enabled. Like the fixing panel in which the fixing information is shown, users may be provided access to bid and offer columns for entering an alternate bid or offer from the default fixing level. The price column that shows the fixing level can preferably be view-only.

Users may specify either a bid or offer price first, and then specify a size, however the order will preferably not be created until a size is entered. Users may specify a size first, and then modify the price. If size is submitted without a price, the default fixing level can be the submitted price and the default fixing level can be shown in the bid or offer field on the side the size was entered. Submitting either a price or size on the opposite side of the current submission—e.g., the user switches sides—may cancel the original submission.

When a user switches sides, the original order can be canceled as soon as the user enters a price or size. However, a new order will preferably not be created until the user enters a size—i.e., entering a price cancels the original order, but the new order will not be created until a size is entered. In some embodiments, a user can also put in a two-sided order.

If the size is canceled, the price field can be reset to the default fixing level. If the price is reset to the default price, then the highlight may be removed. If the size of the side with the alternate price is traded in full, the user-entered alternate price may persist in the price field (the alternate price persists until the order is canceled by the user).

A tooltip may be available in the price field, which will show the default fixing price. Format of the tooltip info: "Fix: <Fixing Price>". For alternate price entry during the matching phase, the price field may append a percent ("%") sign to the price if the interest is quoted in percentage terms.

Trade Execution at Alternate Price Levels

Orders submitted during the matching phase may be executed in real time if preferably all of following conditions are met:

Bid is equal to or greater than the offer; counterparties are from different institutions; and counterparties are not restricted from trading with each other.

Exemplary Trading Rules

Bids and offers that cross can be executed based on the following rules:

Bid at mid+Offer at mid=Trade@Mid

Example: (Fix=20; entries 20/20=trade @ 20)

Worse bid+Worse Offer=No Trade, with possible follow-up market

Example: (max spread=2; Fix=20; entries 19/21=follow up market being cleared in JTA)

Worse bid+Offer at Mid=No Trade, with possible follow-up market

Example: (max spread=2; Fix=20; entries 19/20=follow up market being cleared in JTA)

Better Bid+Offer at mid=Trade@Mid

Example: (Fix=20; entries 21/20=trade @ 20)

Better Bid+Better Offer=Trade@Mid

Example: (Fix=20; entries 21/18=trade @ 20) (The trade is at the Mid rather than the average to avoid atypical price levels)

Better Bid+Worse Offer(crossing)=Trade @Offer

Example: (Fix=20; entries 22/21=trade at 21) (this embodiment preferably allows trading relatively close to the fixing price; this can also apply to multiple trades at different levels)

Order Ranking By Price

In some embodiments, if there are multiple open orders on one side, orders can be ranked by price then time.

Example
Fixing=20.5
BankA bids 5 MM@20.5
BankB bids 5 MM@21
BankC offers 5 MM@20.5
Trade is executed between BankB and BankC for 5 MM@20.5

Reserved Phase Order Ranking

Order ranking rules for the reserved phase—i.e., the trading phase based on submissions during the fixing phase—can preferably be honored.

Example
During the fixing phase, BankA submitted fixing levels but BankB and BankC did not.
Fixing=20.5
BankA bids 5 MM@20.5
BankB bids 5 MM@21
BankC offers 5 MM@20.5
Trade is executed between BankA and BankC for 5 MM@20.5. Since BankB did not participate during the fixing phase, BankA's order receives priority even though BankB has a better bid.

Exemplary Functional Details: Post Matching Session

Changes to Trader Entitlements and Entity Access Level

The JTA trader role can preferably only determine whether a trader receives the JTA popup during the post-matching phase. In the event that the interest is not interactive, but the matching session was initiated on the interest, the interest can be treated as interactive for the duration of the post-matching session.

During the post-matching session, traders that were permitted to participate in the matching session due to their respective joiner and/or fixer role, but are not interactive, may be permitted to create orders and execute trades on interests via the pricesheet. Once the 'Post-Matching Clearing Timer' expires, the interest may be considered in the extended phase if there is at least one live order on the interest, meaning the post-matching session can continue until the interest is no-longer quoted.

During the "extended" phase for an interest, all traders that are permitted to participate in matching for the interest may be permitted to enter prices and execute trades, including traders that did not participate in the matching session.

Once the post-matching session ends—e.g., the interest is unquoted—i.e., either the bid side or offer side—or a predetermined time period has elapsed—order management and trade execution via the pricesheet may no longer be permitted for non-interactive traders.

All traders that are entitled to price or trade the interest may preferably be permitted to participate in the post-matching session. This includes traders that did not participate during the matching phase. One possible exception to this is the case where "Best Price Only" option is enabled for the session.

If the trader has the interactive trader role for the interest, the trader may be permitted to enter prices and execute trades during the post-matching phase even if the trader did not participate during the matching phase. In such a circumstance, clearing restrictions may be applicable. It should be noted that, in certain embodiments, a trader may join, but not trade, by taking priority over original post-matching best buyer and/or best seller positions.

FIG. 1 shows an exemplary layout that may serve as an informative screen popup. Popup 100, which includes an exemplary display of live prices, shows a credit column 102, which lists the derivatives, such as credit default swap contracts, which are the financial instruments which are represented in the popup 100. While the examples described in this application relate to trading of credit default swap contracts, it should be noted that the systems and methods according to the invention preferably apply to all suitable financial instruments.

Column 104 in FIG. 1 shows a current bid size, column 106 shows the current bid price, column 108 shows the current offer price and column 110 shows the current offer size. The x inside the O indicates that the displayed prices are live and tradable. Columns 112-118 show the same information for the trader, and/or broker's, own position.

In one embodiment, column 120 may show the time remaining in the fixing session.

Post Matching Overview

If post-matching is initiated on an interest, then unfilled bids and offers from the matching session may be posted to the market at the end of the matching session for interests that qualify for post-matching initiation.

When post-matching according to the invention is initiated, order clearing can be initiated for preferably all interests that qualify for post-matching.

Unlike conventional order clearing rules, order clearing duration during the post-matching session according to the invention may be determined by the "Post-Matching Clearing Timer" setting for the matching group. Thus, preferably all interests that qualified for post-matching can share the same order clearing timeout duration.

Once the "Post-Matching Clearing Timer" expires, the interest can go directly to the extended phase as long as there is one live-trader-created-bid and one live-trader-created-offer on the interest.

In certain embodiments, traders that have the JTA trader role may receive the JTA popup for all interests after post-matching was initiated.

Regardless of whether a trader has the JTA trader role or interactive trader role, a trader may execute trades and manage orders via a pricesheet—i.e., a listing of active prices on a predetermined financial instrument—as long as the trader is permitted to participate in the matching session. During the post-matching session, any trades may generate workup sessions via the live trade popup—as shown in FIG. 1—if workup is enabled for the interest.

Live trade (referred to alternatively as "JTT") is triggered by a posted trade, and allows other traders to join the trade, preferably at the traded price, preferably following an exclusive trading session between the original traders.

Preferably all traders that were permitted to participate during the matching phase may generally be permitted to participate in live trade sessions generated during the post-matching phase. At post-matching clearing timer expiry (end of the clearing phase) the post matching phase may go into an extended session, if the following exemplary conditions are met:

1. Interest has at least one posted bid and one posted offer created by a trader (broker created orders are not counted); and
2. Live trade session is in progress (post-matching ends if order is not created via post-unfilled at live trade expiry).

If the conditions required to extend the post matching session are not met, the session may end and preferably all JTA popups close.

During the post-matching session according to the invention, the JTA indicator may be shown to all brokers and all traders next to the credit name and entity market name of interests in the pricesheet.

Post-Matching Initiation Rules

Post-matching may preferably only be initiated if the following conditions are met:
a. There is an unfilled bid and an unfilled offer.
b. Best unfilled bid and best offer are not equal or crossed (this can happen if counterparties are from the same institution or are counterparty restricted).

Post matching will preferably not be initiated if the best bid and best offer are from the same institution even if there are unfilled orders in depth from other institutions.

Application of Post-Matching Spread

In some embodiments, the spread between the best bid and best offer should preferably be within the post-matching spread defined for the interest.

Example

Max post-matching spread=2
Fixing price=100
Permitted price range during matching=98-102
If best bid and best offer is 98-100, post-matching will preferably be initiated.
If best bid and best offer is 98-101, post-matching will preferably not be initiated.

Post Matching Order Creation

Orders for the post matching phase may be created based on the following exemplary criteria:

Exemplary General Rules

In some embodiments, unfilled bids and offers that are equal or crossed but did not trade in the matching phase will preferably be canceled and not carried over from the matching to post-matching, phase.

The size of orders shown to the market can be for the default size of the interest, and any amount greater than the default can be created as hidden size. If there are only unfilled orders on one side, then post-matching will preferably not be initiated.

"Best Price Only" Setting Disabled

Preferably all unfilled bids and offers that are not crossed or equal may be carried over into the post-matching phase. Inline depth—i.e., the available stack of bids or offers—can be disabled in the JTA popup, but viewable in the pricesheet—i.e., viewable via inline and docked depth. It should be noted that in an inline depth with, for example, three bidders and two offerors, only a portion of the buyers and/or the sellers may qualify for post-matching trading, depending on the relationship of the respective bids or offers to the matching price and the spread. While the non-qualifying portion of the bidders and offerors may not be posted for post-matching, nevertheless their respective bids and offers may still be tradeable via the pricesheet.

"Best Price Only" Setting Enabled

Preferably only the best unfilled bid and best unfilled offer that are not equal and not crossed can be carried over into the post-matching session. In the best price only state, the prices are unposted to the market. Accordingly, the eventual trade is unposted and typically does not trigger a workup followed by a JTA session.

Exemplary Order Clearing Phase

During the post-matching order clearing phase, only the owner of the best bid may execute the offer or improve the existing best bid and only the owner of the best offer may execute the bid or improved the existing best offer. Other participants to the session may enter joining bids at the best bid level or worse levels, and/or joining offers at the best offer level or some level worse than the best offer level. However, while these joining traders may take priority over the original post-matching best buyer and/or seller, they are not allowed to trade in their stead.

An exception to these rules, according to the invention, is the case where traders that are members of a group share matching sessions, in which preferably all traders from a group that trade as a single entity share execution rights during the order clearing phase. The order clearing timer defined for the entity (financial instrument) or bond preferably determines the duration of the order clearing phase of the post-matching session.

In certain embodiments, both sides may be locked during the order clearing phase of post-matching sessions. This aspect preferably introduces simultaneous bid and offer creation.

Order Clearing Trigger Exceptions

Order clearing may not be triggered if the best bid and best offer are from counterparty-restricted traders. Order clearing may also not be triggered if the best bid and best offer are from clearing method restricted traders—e.g., a bid associated with a company that is restricted to clearing with an exchange such as Intercontinental Exchange ("ICE") only vs. an offer associated with a company that is restricted to bilateral trading only. Restricted orders can be shown in the restricted format to applicable users.

Order Management During Order Clearing

If Best Price Only is Disabled

Selected order management requirements during clearing can be the same as the existing behavior. In addition, certain of the order management requirements may be different according to the invention.

Requirements for the Best Bid and Best Offer

When the best bid or offer is updated to a better level, then the order clearing timer may reset and start again. During order clearing, the size of the best bid or best offer may preferably be updated, although in some embodiments the size may not be updated. If the best bid is updated to the same level as the best offer, or vice versa, the trade execution option may be presented if an auto match setting is enabled for the interest.

In some embodiments, during order clearing, the broker may not update the site or trader to different values via the price update dialog. During order clearing, an order that is being cleared will preferably not be held by hold all, or other similar, actions. The best bid and best offer may preferably not be held or deleted manually during the order clearing period.

In one aspect of the invention, during order clearing, if the owner of the best bid or best offer attempts to hold their order, the order may be held preferably only after the clearing timer expires.

Orders in Depth During Order Clearing

Bids and offers in depth may be updated to a better level—i.e., up to the level of the best bid or best offer. However, a trader can only join, but not trade, by taking priority over original post-matching best buyer and/or seller.

Orders in depth may be updated to a worse level, according to the invention. Further, the size of orders in depth may be updated. Orders in depth may be held.

Order Management if "Best Price Only" is Enabled

In certain embodiments, if a best price only feature is enabled, then order management during the clearing phase may only be permitted for the owners of the best bid and best offer. It should be noted that, in such embodiments, group member entitlements can be restricted from order management actions, because group entitlements may not extend to order management in the pricesheet.

Trade Execution

During order clearing, preferably only the counterparties that own the best bid and own the best offer and group members may be permitted to trade. If there is a trade during order clearing, order clearing may terminate immediately at the end of a live trade session and the interest can be open for all entitled participants until the end of the post-matching session. This may also be true independent of the best price only setting.

Live trade sessions can preferably only be initiated if live trade is enabled for the entity and entity live trade default settings are applied.

In certain embodiments, if best price only is enabled and there is no trade between the counterparties with the best bid and offer during the order clearing phase, the post-matching session ends when the order clearing time expires.

Post Order Clearing Phase

When the Post-Matching Clearing Timer expires, and the post-matching session goes into an extended phase, the interest can be open for all users for order entry and trade execution until the interest becomes unquoted. Order management and trade execution rules typically remain the same as the pricesheet rules with the exception that all matching participants are entitled to order management and trade execution privileges during the post-matching session.

Any trade executions can generate live trade sessions if workup is enabled for the interest. The post-matching session may end once the post-matching timer expires if the interest is not quoted at timer expiry.

If the interest is quoted at timer expiry, then the post-matching session can continue until the interest is no longer quoted with an order submitted by a trader. At post-matching expiry, all JTA popups may close and the interest in the pricesheet follows standard order management and trade execution rules.

During the post-matching session, fixing and matching sessions may preferably not be initiated on the interest. Once the post-matching clearing timer expires, matching and fixing sessions may be initiated on the interest, even if there are live orders on the interest.

Application of JTA Controls During Post-Matching

For brokers and traders, the "Popup Live Trade" sector/workspace setting preferably determine whether JTA popups are generated when initiated via post-matching sessions.

Brokers Specific Use Case

Matching Group Setup:
Post-Matching=Yes
Best Price Only=No
Allow Pull Out=Yes
Post Matching Clearing Timer=20 sec
DT 5y, Fix=100, Post-Matching Spread=2
BRITEL 5y, Fix=100, Post Matching Spread=2
F 5y, Fix=100, Post Matching Spread=2
Default Size=5 MM
Users (all Users Preferably have Popups Enabled):
ABC1, Post Unfilled for Post Matching=Yes, Joiner
GS1, Post Unfilled for Post Matching=No, Interactive
DB1, Post Unfilled Post Matching=No, Joiner+JTA
DEFG1, Does not participate in Matching, Interactive
All users have post-unfilled for Live Trade enabled.

Matching Session Events:
The following orders, based on the foregoing, exemplary, matching group setup, are submitted during matching:

| DT 5 y, Fix = 100, Post-Matching Spread = 2 | | |
|---|---|---|
| Trader | Bids | Offers |
| ABC1 | 10MM@100 | |
| GS1 | | 10MM@ 101 |
| DB1 | 10MM@100 | |

No trades are executed.
Post matching is initiated.

| BRITEL 5 y, Fix = 100, Post-Matching Spread = 2 | | |
|---|---|---|
| Trader | Bids | Offers |
| ABC1 | 10MM@101 | |
| GS1 | | 10MM@ 100 |
| DB1 | 10MM@99 | |

ABC1 trades with GS1 for 10 MM@100.
Post matching is not initiated since there is only a one-sided market left.

| DT 5 y, Fix = 100, Post-Matching Spread = 2 | | |
|---|---|---|
| Trader | Bids | Offers |
| ABC1 | 10MM@99 | |
| GS1 | | 10MM@ 102 |
| DB1 | 10MM@99 | |

No trades are executed.
Post matching is not initiated since the spread between the remaining bids and the remaining offer is greater than 2.

Post Matching Session Events:

The following orders may be created in the pricesheet (if unfilled size is greater than default, or in some other suitable circumstance, then iceberg orders—i.e., orders with hidden size—are created. Hidden size is shown below in parentheses):

| DT 5 y, Fix = 100, Post-Matching Spread = 2 | | | |
|---|---|---|---|
| Trader | Bids | Offers | Trader |
| ABC1 | (5MM) 5MM@100 | (5MM) 5MM@ 101 | GS1 |
| DB1 | (5MM) 5MM@100 | | |

ABC1's bid is clearing to GS1 and GS1's offer is clearing to ABC1. GS1 and ABC1 are unable to pull their orders during clearing. DB1 is unable to execute either order. As stated above, ABC1 and GS1 do not receive the JTA popup; therefore they manage their orders via the pricesheet. DB1 receives the JTA popup.

After five seconds GS1 hits ABC1's bid for 5 MM@100. A live trade session is initiated and ABC1 is auto-worked up for buy 5 MM more.

DB1 is auto-joined to buy 10 MM@100. GS1 works up to sell 5 MM more and is matched with ABC1. DEFG1 joins to sell 5 MM and is matched with DB1 for 5 MM@100 after the reserved phase.

At the end of Live Trade the following orders are left:

| DT 5 y, Fix = 100, Post-Matching Spread = 2 | | | |
|---|---|---|---|
| Trader | Bids | Offers | Trader |
| DB1 | 5MM@100 | (5MM) 5MM@ 101 | GS1 |

Clearing is expired, but DT 5y is considered to be in the "extended" phase, since there are live trader created orders on the interest. ABC1 then enters a bid for 5 MM@100.5.

The following orders are in the market:

| DT 5 y, Fix = 100, Post-Matching Spread = 2 | | | |
|---|---|---|---|
| Trader | Bids | Offers | Trader |
| ABC1 | 5MM@100.5 | (5MM) 5MM@ 101 | GS1 |
| DB1 | 5MM@100 | | |

On DT 5y (the entity (or, alternatively, the interest) name), all traders that are entitled to participate in matching sessions for the interest will be permitted to interactively price and trade the interest, until the interest becomes unquoted. Since post-matching was not initiated on BRITEL 5y or F 5y, order entry and trade execution will not be permitted on these interests by non-interactive traders.

Thus it has been shown that systems and methods for implementing a matching session utilizing an algorithm to support trades occurring at prices other than a mid-price and for implementing post-matching trading have been provided. One skilled in the art may appreciate that the present invention can be practiced by other than the described embodiments, which are presented for purposes of illustration rather than of limitation, and the present invention is limited only by the claims which follow.

What is claimed is:

1. A financial instrument transaction system, comprising:
   a database configured to store financial instrument information for certain reference entities;
   memory configured to store execution instructions; and
   a processor coupled with the database and the memory, the processor configured to execute the instructions, the instructions configured to cause the processor to:
   initiate a trading session for a predetermined duration;
   prior to and during the trading session, receive from each one of a plurality of trader clients a trading position associated with a reference entity;
   establish a mid-price based on the instructions received from the plurality of trader clients;
   and
   during the trading session, execute trading for the reference entity at a matching price, said matching price being different from the mid-price, said matching price being based on at least a first trading position and a second trading position;
   wherein, when the absolute value of the difference between the first trading position and the mid-price is greater than the absolute value of the difference between the second trading position and the mid-price, the processor is further configured to set the matching price closer to the second trading position than to the first trading position and, when the absolute value of the difference between the second trading position and the mid-price is greater than the absolute value of the difference between the first trading position and the mid-price, the processor is further configured to set the matching price closer to the first trading position than the second trading position.

2. The system of claim 1, the instructions further configured to determine at the end of the trading session, based on predefined criteria, whether the trading session qualifies for a post-matching session; and if the trading session qualifies for a post-matching session, providing a graphical user interface to a selected group of traders for trading in the post-matching session.

3. The system of claim 2, the instructions further configured to terminate the trading session at the end of the trading session if the trading session fails to qualify for the post-matching session.

4. The system of claim 1, the instructions further configured to determine the matching price based at least in part on mid-price.

5. The system of claim 4, the instructions further configured to determine the matching price based at least in part on a current bid.

6. The system of claim 4, the instructions further configured to determine the trading price for the price other than the mid-price based at least in part on a current offer.

7. The system of claim 6, the instructions further configured to determine the matching price based at least in part whether a current bid and a current offer are crossed.

* * * * *